(12) United States Patent
Arms

(10) Patent No.: US 10,148,993 B2
(45) Date of Patent: Dec. 4, 2018

(54) METHOD AND SYSTEM FOR PROGRAMMABLE LOOP RECORDING

(71) Applicant: Swarms Ventures, LLC, Shelburne, VT (US)

(72) Inventor: Steven Arms, Shelburne, VT (US)

(73) Assignee: Swarms Ventures, LLC, Shelburne, VT (US)

( * ) Notice: Subject to any disclaimer, the term of this patent is extended or adjusted under 35 U.S.C. 154(b) by 0 days.

(21) Appl. No.: 15/524,050

(22) PCT Filed: Nov. 10, 2015

(86) PCT No.: PCT/US2015/059810
§ 371 (c)(1),
(2) Date: May 3, 2017

(87) PCT Pub. No.: WO2016/077262
PCT Pub. Date: May 19, 2016

(65) Prior Publication Data
US 2017/0339446 A1    Nov. 23, 2017

Related U.S. Application Data

(60) Provisional application No. 62/077,870, filed on Nov. 10, 2014.

(51) Int. Cl.
*H04N 21/2747* (2011.01)
*H04N 21/231* (2011.01)
(Continued)

(52) U.S. Cl.
CPC ....... *H04N 21/2747* (2013.01); *H04N 21/231* (2013.01); *H04N 21/4147* (2013.01);
(Continued)

(58) Field of Classification Search
CPC .................. H04N 21/2747; H04N 21/4335
See application file for complete search history.

(56) References Cited

U.S. PATENT DOCUMENTS 8,449,410 B1 * 5/2013 Kaufman ............... A63B 49/08
473/459
8,520,070 B1   8/2013 Englander et al.
(Continued)

FOREIGN PATENT DOCUMENTS

| EP | 2306703 A1 * | 4/2011 | ......... H04N 21/4147 |
| EP | 2781240 A1 | 9/2014 | |
| WO | 2013136712 A1 | 9/2013 | |

OTHER PUBLICATIONS

GOPRO, "User Manual Hero4 Black", Sep. 29, 2014.
(Continued)

*Primary Examiner* — Nasser Goodarzi
*Assistant Examiner* — Adil Ocak
(74) *Attorney, Agent, or Firm* — Justin W. McCabe; Dunkiel Saunders Elliott Raubvogel & Hand, PLLC

(57) ABSTRACT

A loop recording system allows users to remotely save and share short recorded video, audio, or combination clips using portable devices equipped with cameras, microphones, and sensors. The loop recording system enables users of portable devices, such as smartphones, tablets, smart watches, etc., to record moments of interest during live events (hereinafter called "loops", "recordings", or "loop recordings"), while preventing unwanted data loss and conserving memory resources of the portable device. In exemplary embodiments, the loop recording system has loop recording intervals that can be defined by the user or can be predetermined, certain recordings can be automatically saved rather than overwritten, and/or the number of recordings that are saved may be programmable by the user or predetermined. The loop recording system can also prevent
(Continued)

unwanted erasure of data, facilitating the tagging of loops, sharing of loops, and enhancing the loops using post processing means.

26 Claims, 8 Drawing Sheets

(51) Int. Cl.
*H04N 21/4147* (2011.01)
*H04N 21/4335* (2011.01)
*H04N 21/433* (2011.01)
*H04N 5/78* (2006.01)

(52) U.S. Cl.
CPC ..... *H04N 21/4331* (2013.01); *H04N 21/4334* (2013.01); *H04N 21/4335* (2013.01); *H04N 5/7805* (2013.01)

(56) References Cited

U.S. PATENT DOCUMENTS

| | | | |
|---|---|---|---|
| 8,965,041 B2 | 2/2015 | Muriello et al. | |
| 9,014,661 B2 | 4/2015 | Decharms | |
| 9,094,615 B2* | 7/2015 | Aman | G01S 3/7864 |
| 9,565,462 B1 | 2/2017 | Cernicek et al. | |
| 2002/0131765 A1* | 9/2002 | Dekeyser | H04N 5/9261 |
| | | | 386/327 |
| 2007/0154163 A1* | 7/2007 | Cordray | H04N 5/782 |
| | | | 386/278 |
| 2010/0118150 A1* | 5/2010 | Boland | H04N 5/2259 |
| | | | 348/207.1 |
| 2012/0097014 A1* | 4/2012 | Matsumoto | G10H 1/0033 |
| | | | 84/634 |
| 2012/0308209 A1* | 12/2012 | Zaletel | G11B 27/034 |
| | | | 386/278 |
| 2013/0066448 A1* | 3/2013 | Alonso | H04Q 9/00 |
| | | | 700/91 |
| 2013/0178966 A1* | 7/2013 | Magnusson, Jr. | |
| | | | G06K 9/00744 |
| | | | 700/94 |

OTHER PUBLICATIONS

Thomas, "International Search Report and Written Opinion of the International Searching Authority", related to International Application No. PCT/US15/59810, dated Feb. 2, 2016.
Wong, "Canadian Patent Office Search Report", dated Oct. 16, 2017.
Canadian Intellectual Property Office, "Notice of Allowance", related to Canadian Application No. 2,967,326, dated Jan. 29, 2018.
Santos Conde, "Supplementary European Search Report", related to European Application No. 15 85 8416, dated Feb. 13, 2018.
Mousseau, "Amendment and Response to Examiners Report", related to Canadian Application No. 2,967,326, dated Jan. 16, 2018.

* cited by examiner

US 10,148,993 B2

METHOD AND SYSTEM FOR PROGRAMMABLE LOOP RECORDING

RELATED APPLICATION DATA

This application claims priority to U.S. Provisional Application Ser. No. 62/077,870, filed Nov. 10, 2014 and titled "Method and System for Programmable Loop Recording", and is incorporated herein in its entirety.

FIELD OF INVENTION

The present invention generally relates to audio and video recording. In particular, the present invention is directed to a method and system for programmable loop recording.

BACKGROUND

Loop recording is the process of recording audio or video continuously onto an appropriate recording media by having the recording process, once it reaches the end of the media, restart from the beginning of the media. Once the recording process continues to record at the beginning, the system records over the previously recorded material and replaces it with the new content.

Looping systems include large disk drive capacities in order to enable the capture of many hours (or days) of video and/or audio from one or more devices. Typically, these looping systems are designed for permanent installations such as for performance stadiums or around a large operational facility. However, these existing systems are not suitable for portable consumer applications due to their relatively large size, high power requirements, attendant wiring, large memory requirements, and relatively high cost. Looping systems that are available on small cameras automatically being to overwrite, from the beginning of the memory, recordings if the memory is full or if a request to save is not designated by the user while the loop recording is in progress. These systems fail to appropriately use memory capacity and are difficult to remotely operate, share and/or collaborate with other interested viewers of the event/recordings, and fail to support multiple users of the video recorder.

SUMMARY

A loop recording system for recording a live event comprising: a portable video recording device including a non-transitory storage medium and a processor, the processor executing a set of instructions for: receiving, at the portable video recording device, a record length and a record number, wherein the record length is greater than 4 seconds and less than about 30 seconds, and wherein the record number is greater than or equal to 3; receiving, at the portable video recording device, a command from the user; recording a video segment as a result of the command, the video segment having a duration greater than or equal to the record length, the video segment including a video data stream, an audio data stream, or both; saving the video segment to the non-transitory storage medium; and repeating the recording a video segment and the saving the video segment until the number of video segments recorded is equal to the record number, wherein, when the number of video segments recorded is equal to the record number and the portable computing device has not received a command to stop recording, the processor executes a set of instructions to: delete a then oldest video segment from the non-transitory storage medium; and record another video segment, the another video segment having the duration, the video segment including a video data stream, an audio data stream, or both, and save the another video segment to the non-transitory storage medium.

An event recording system comprising: a remote recording device including a video recorder having a non-transitory storage medium divided, at least in part, into a predetermined number of partitions, the remote recording device configured to: record a plurality of video segments, wherein each of the plurality of video segments has a duration and is saved into a corresponding respective one of the predetermined number of partitions; delete a then oldest video segment when the predetermined number of partitions is full; record a new video segment in the partition occupied by the then oldest video segment; stop the recording of a then current video segment when instructed by a user; and sequentially merge the then current video segment with the plurality of video segments after the stopping the recording to generate a video clip.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

DESCRIPTION OF THE DISCLOSURE

A loop recording system (LRS) and method according to the present disclosure enables users of portable devices capable of recording, such as smartphones, tablets, smart watches, etc., to record moments of interest during live events (hereinafter called "loops", "recordings", "loop recordings", or "video clip", and portions thereof being referred to herein as "intervals" or "segments"), while preventing unwanted data loss and conserving the memory resources of the portable device. In exemplary embodiments, the LRS has loop recording intervals that can be defined by the user or can be predetermined, certain recordings can be automatically saved rather than overwritten, and/or the number of recordings that are saved may be programmable by the user or predetermined. An LRS according to the present disclosure can also merge one or more of the recordings into a sequentially arranged video clip. An LRS according to the present disclosure can also prevent unwanted erasure of data, facilitating the tagging of loops, sharing of loops, and enhancing the loops using post processing means. Certain embodiments of the LRS disclosed herein can support multiple users of the same portable video recording device, such that each user can interact with the portable video device so as to save individualized video clips, e.g., video clips of different portions of the same event under recording. Additionally, certain embodiments of the LRS disclosed herein can facilitate multiple portable devices all recording the same event, the portable devices being synchronized so as to support a stereoscopic viewing experience.

Figure 1:
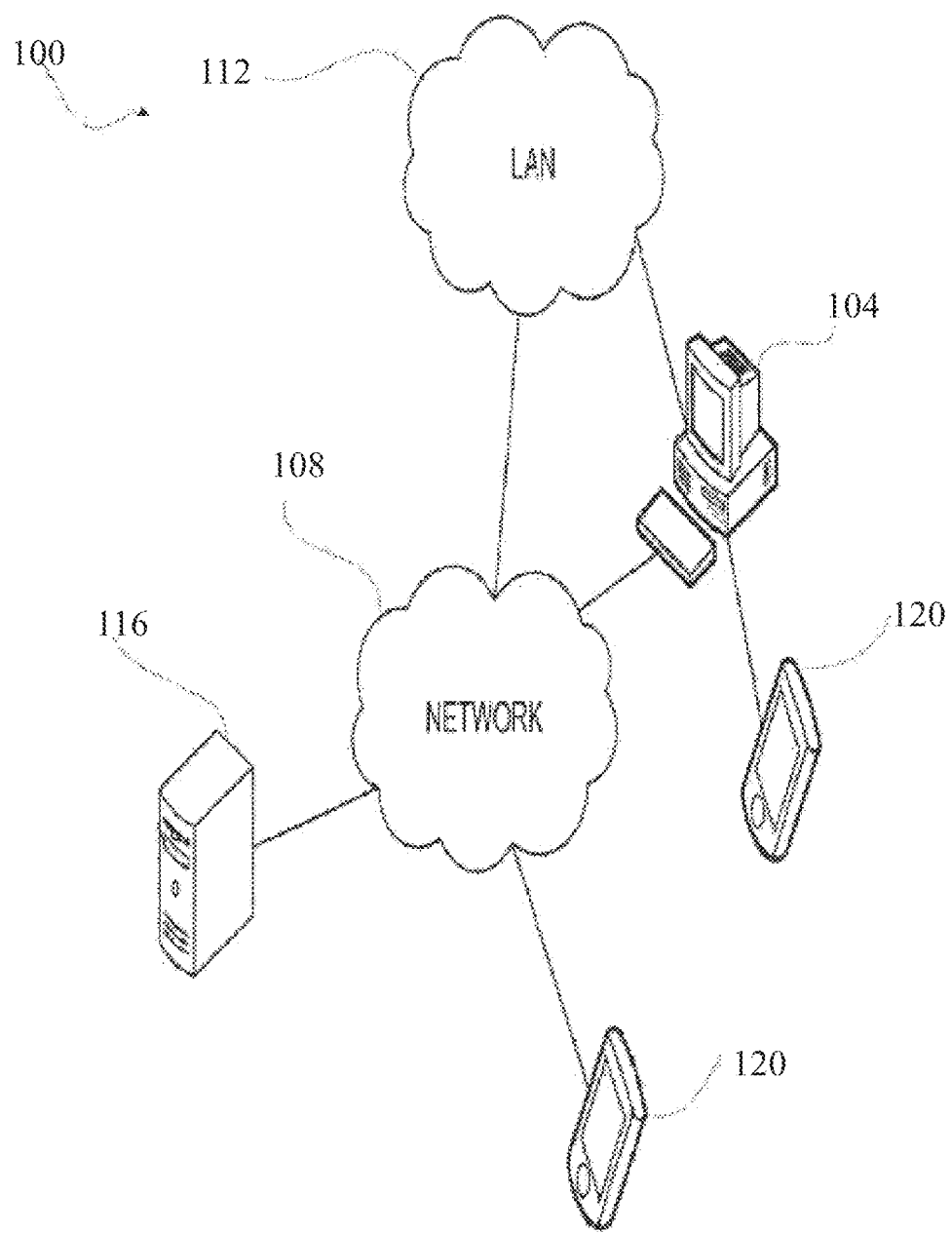
FIG. 1 is a schematic representation of an information system for use with a loop recording system (LRS) according to an embodiment of the present invention.
Figure 2:
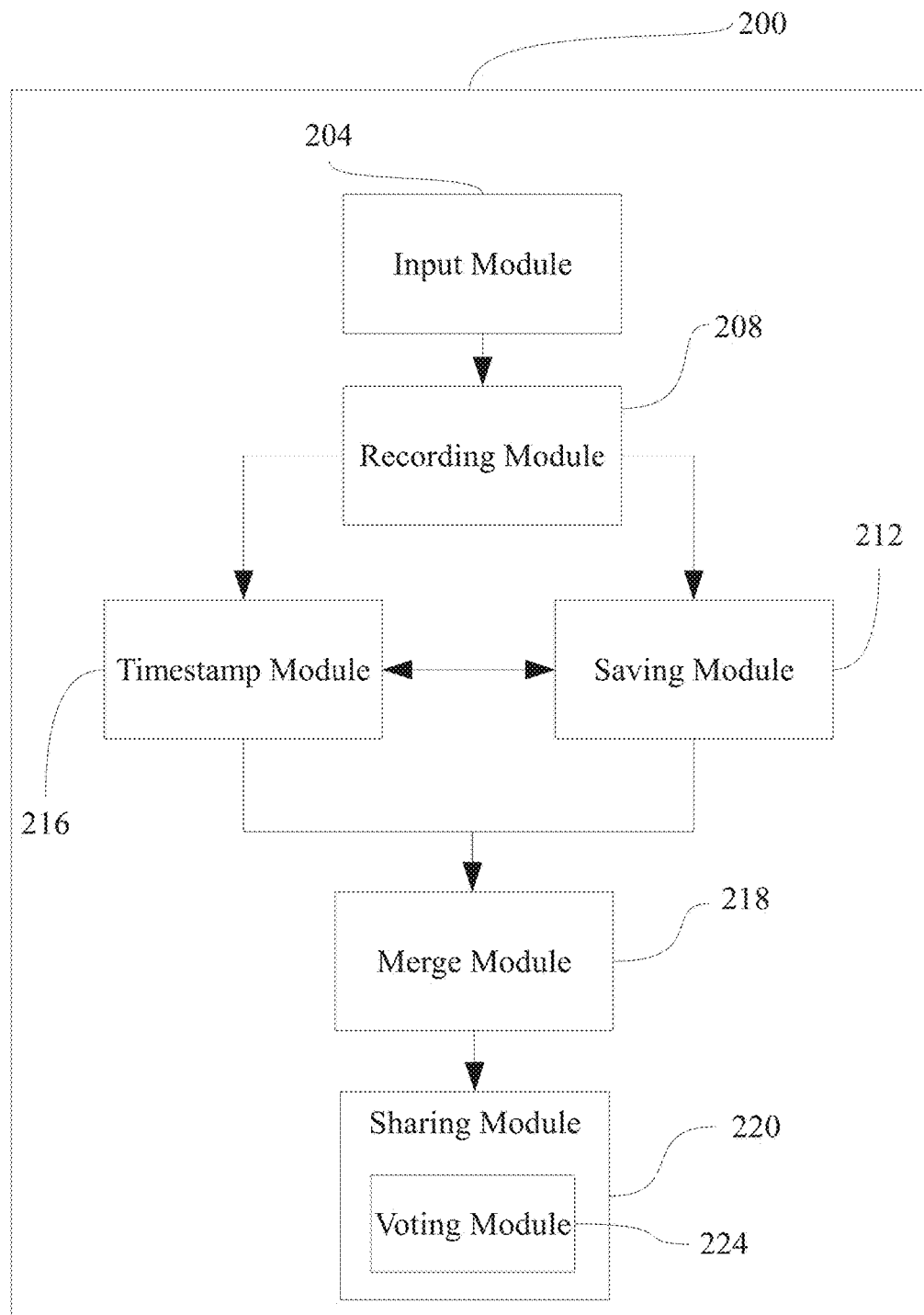
FIG. 2 is a block diagram of an LRS according to an embodiment of the present invention.

Turning now to the figures, FIG. 1 schematically illustrates an embodiment of a system 100 used facilitate that operation of an LRS, such as LRS 200 (depicted in FIG. 2 and discussed below). System 100 may be used to communicate a wide variety of information within and external to LRS 200 including, but not limited to, recording information, connection/sharing information, user preferences, and recording settings, including, but not limited to, timestamp, date, duration, loops, and activity specific information.

System 100 may include a computing device 104, an information network 108, (such as the Internet), a local area network 112, a content resource 116, and one or more portable devices 120. Computing device 104 and portable devices 120 may communicate through information network 108 (and/or local area network 112) in order to access information in content resource 116. Content resource 116 can be, for example, a non-transitory machine readable storage medium, whether publicly accessible, privately accessible, or accessible through some other arrangement such as subscription (e.g., a cloud-based service), that holds recordings and recording related information, data, databases, programs, algorithms, or computer code, thereby accessible by computing device 104, portable devices 120, and LRS 200.

As those skilled in the art will appreciate, computing device 104 may take a variety of forms, including, but not limited to, a web appliance, a laptop computer, a desktop computer, a computer workstation, a terminal computer, web-enabled televisions, media players, and other computing devices in communication with information network 108.

Information network 108 may be used in connection with system 100 to enable communication between the various elements of the system. For example, as indicated in FIG. 1, information network 108 may be used by computing device 104 to facilitate communication between content resource 116 and the computing device, as well as portable devices 120. Those skilled in the art will appreciate that computing device 104 may access information network 108 using any of a number of possible technologies including a cellular network, Wi-Fi, wired internet access, Bluetooth®, combinations thereof, as well as others not recited, and for any of a number of purposes including, but not limited to, those reasons recited above.

As certain recording locations may be relatively inaccessible by wireless transmissions, in an exemplary embodiment one or more of the modules included with LRS 200 (discussed in detail below with reference to FIG. 2) reside on computing device 104 or portable devices 120. This configuration can allow a user to record events and to later upload or modify the relevant data when connected to information network 108, if desired. Alternatively, communication between the modules included with LRS 200 may be initiated through a webpage instantiated in a web-based environment that is accessible through an information network, such as information network 108. In this embodiment, if wireless Internet access is available, then the data may be transmitted to a database residing on a server or other remote storage medium. If wireless Internet access is not available, then the data can be saved locally (i.e., on portable device 120) until such time that wireless Internet access is available and/or the user desires to send the saved data or a collection of saved data back to the server.

As noted above, LRS 200 includes one or more software modules configured to allow for recording of live events while minimizing memory usage; the input of recording requirements; recording of events; timestamping portions of the recorded loops; saving recorded loops remotely by multiple parties; merging the recorded intervals sequentially to create a loop/video clip; sharing of recordings by multiple users; and a polling of the recordings by those interested in the event. In an exemplary embodiment, LRS 200 includes an input module 204, a recording module 208, a saving module 212, a timestamp module 216, a merge module 218, and a sharing module 220 that can include a voting module 224.

Input module 204 allows a user(s) to interact with the portable device, such as portable device 120. For example, input module 204 may be configured to allow the user to input various parameters for recording loops using the portable device (explained in further detail below). Input module 204 also typically allows for user(s) to interact with the portable device during an event that is being recorded. For example, a user may interact with input module 204 so as to initiate the saving of a loop recording (via saving module 212). Input module 204, as explained in more detail below with reference to process 600 (FIG. 7), can be configured to accept wireless communications from remote devices or sensors that send commands indicative of certain sounds, motion, etc. In an exemplary embodiment, multiple users can interact with input module 204 so as to personalize the recording of the event by the portable device. For example, any user may provide a "save" command to input module 204 and LRS 200 can, as discussed in more detail below, provide the video clip to the user who initiated the save command or other users who also desire the same video clip. In this embodiment, LRS 200 would continue to record after the "save" command is given thereby allowing another user (or the same user) to save another video clip (possibly include a portion of the prior video clip that was the subject of the prior save request.

Recoding module 208 records intervals (audio, video, wearable sensor data, or any combination thereof) according to the parameters set by the user (or via certain predetermined parameters). Recording module 208 typically interacts with both the recording camera, such as video recorder 320 (FIG. 6) and/or input device 308 (FIG. 5), and a memory, such as storage device 724 (FIG. 8), included with the portable device. Recording module 208 may also interact with a remote server using, for example, information network 108. Recording module 208 can also be configured to monitor audio and/or video from the portable device and determine whether or not to save a recording.

Timestamp module 216 associates a local time with one or more portions of the recording completed by recording module 208. In an exemplary embodiment, timestamp module 216 associates a local time with the beginning and ending of each recording, with the local time then being stored along with the recording. In another exemplary embodiment, timestamp module 216 associates a local time with each frame recorded by recording module 208. The local time can be determined by timestamp module 216 interacting with a cellular network or global positioning system that includes a reference of the local time or via other means known in the art.

In an exemplary embodiment, the inclusion of timestamp module 216 enables time-synchronization of multiple portable devices having video recorders, such as portable device 120. Time-synchronized recording by multiple portable devices can provide multi-angle viewing of the same event, thereby allowing replays from different recorded aspects. Time-synchronized recording can also assist with 3-D viewing of the event. For example, two time-synchronized portable devices, configured to record the event in binocular vision, can, when combined with a virtual reality device such as Oculus Rift® or on a 3D television set, provide a 3D viewing experience of the event.

In certain embodiments, wearable sensors, such as, but not limited to, force sensing elements embedded within an athletic shoe or motion sensors embedded in the handle of a tennis racquet (such as the one described in International Application No. WO 2013174922, filed May 23, 2013 and entitled "Tennis Racket"), can be time synchronized with a recorded video of the event. Advantageously, this time synchronized wearable sensor data could be viewed along with the time-synchronized loop video recording to enhance sports training.

Saving module 212 uses input parameters and other inputs from users to determine a recording priority for each interval recorded by recording module 208. For example, if the recording parameters indicate that 3 loops, each having a duration of 1 minute are to be recorded, saving module 212 monitors the recording of each interval to a memory (either local or remote). Saving module 212 can also specify to recording module 208 which interval (if any) should be recorded over based upon inputs received by LRS 200. Saving module 212 can also interact with input module 204 such that requests to retain certain recordings are logged and the recordings preserved. Saving module 212 can also be configured to monitor memory usage and volume. In general, the number of intervals that are saved to memory is programmable by the user or can be preprogrammed according to the certain criteria, e.g., event type, memory size, etc. Typically, the number of intervals will be sufficient such that one or more previously recorded intervals would not be immediately overwritten. Delaying overwriting of previously recorded intervals facilitates sharing of video clips with other persons and allowing persons with access to save certain prerecorded intervals.

In an exemplary embodiment of saving module 212, the saving module evaluates the available memory on the portable device and determines an appropriate recording segment duration based upon the available memory. This embodiment can be advantageous where the user is unsure as to the desirable segment length. In another exemplary embodiment of saving module 212, the saving module is able to interact with multiple users so as to save different sets of intervals for different users. These different sets of intervals may be merged, using merge module 218, so as to provide different video clips to each user of LRS 200.

Figure 3:
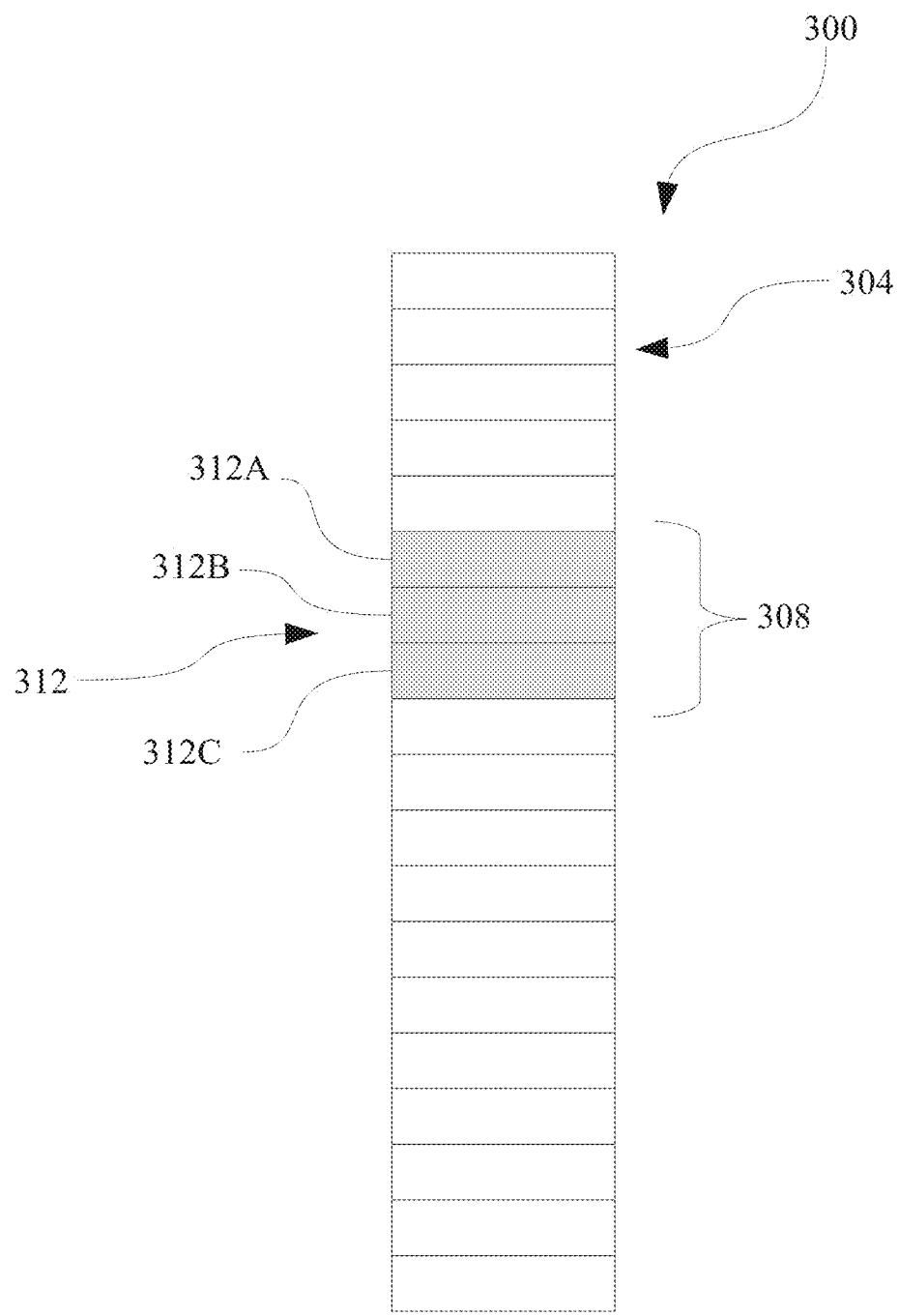
FIG. 3 is a diagram of an exemplary partitioned memory for use with an LRS according to an embodiment of the present invention.

Shown in FIG. 3 is a diagram of a memory 300 that has been partitioned into a plurality of segments 304 by saving module 212. Each of segments 304 is, in this embodiment, the same size (e.g., a storage size of, for example, 10 MB). In an exemplary embodiment, the size of each segment 304 corresponds to the inputs provided by a user. For example, the user may, as discussed in more detail below and in addition to other parameters, specify the length of each interval to be recorded and the number of intervals to record. This information can be used to partition some or all of memory 300 into segments 304 that are suitable to record video (at, for example, a desired frame rate). As an example, and as shown in FIG. 3, memory 300 has partitioned a recording portion 308 of the memory into 3 substantially equal segments 312, e.g., 312A-312C. When in use, recording module 208 begins recording into one of segments 312A-C and cycles through the remaining segments until recording module is instructed to stop. Thus, for example, if recording module 208 began recording with segment 312A it would continue to record, unless stopped, until segment 312A was full, then the recording module would continue on to record information into segment 312B, and then to segment 312C. In this embodiment, if no stop or save command was received by the time segment 312C was full, recording module 208 would delete the video in segment 312A and would record a new video in that segment. The process of deleting and recording would continue until recording module 208 was stopped or a save command given.

Although the process described just above references a "stop" command, it should be understood that the process could be carried out by issuing a "save" command, such that the portable device continues to record while merge module 218 (discussed below) merges the appropriate segments, e.g., the then current segment and the prior segments specified by the user.

Figure 4:
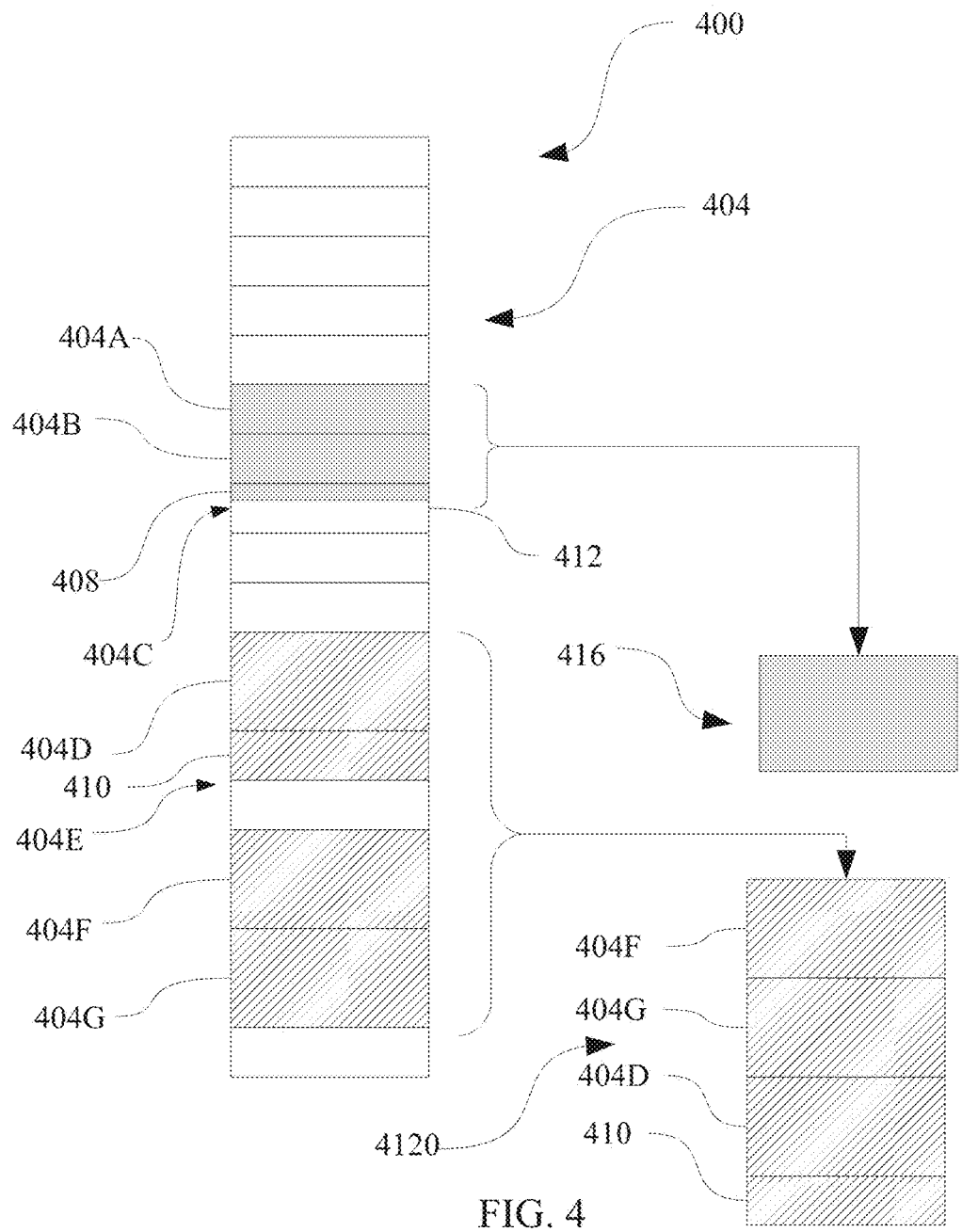
FIG. 4 is a diagram of another exemplary partitioned memory for use with an LRS according to an embodiment of the present invention.

FIG. 4 shows another exemplary embodiment of a memory, memory 400, that has been partitioned into a plurality of segments 404 by saving module. Although substantially similar to memory 300, memory 400 includes segments 404 of different sizes, which can indicate a change in preferences by a user. For example, a user may desire to record 3 intervals of 25 seconds each (represented in FIG. 4 by segments 404A-C) so as to record a tennis match and, at another time, may desire to record 4 intervals of 60 seconds each (represented by segments 404D-G) for a hockey game. FIG. 4 also exemplifies the example where a stop command has been received and only a portion of a segment, e.g., portion 408 of segment 404C or portion 410 of segment 404E, has been filled with information. In an exemplary embodiment, saving module 212 may determine that the remainder of segment 404C remains empty (empty portion 412) and resegment memory 400 so as to more fully utilize the memory. Although each group of segments, e.g., 404A-C and 404D-G, has segments that are proximate one another, it should be understood that segments can be dispersed in memory 400 so as to effectively use the entirety of memory 400 as recordings are made and saved.

Merge module 218 combines the recorded intervals, e.g., segments 312A-C, into a video clip for the user. Merge module 218 is configured to receive, as an input, notification of the stop or save command, which indicates to saving module 212 that the recording has completed. Once the stop command is received and the recording has been saved to memory, such as memory 300 or 400, merge module 218 can prepare a video clip, such as video clip 416 (FIG. 4). Video clip 416 is the assembly of segments, such as segments 404A and 404B and any portion of a segment, e.g., portion 408, into a time sequential recording. As another example, merge module 218 combines segments 404D, 404F, and 404G and portion 410 to generate video clip 420. As is evident, while the recording into memory 400 was looped, merge module 218 reorganized the segments so as to create a time sequential clip (in other words, the recordings in 404D and 410 occurred later than those in 404F and 404G). Merge module 218 may receive information from timestamp module 216 so as to appropriately organize videos or may have other information from saving module 212, such as a unique identifier associated with each segment, which allows for sequential manipulation by the merge module.

Sharing module 220 facilitates the dissemination of loops saved by saving module 212. Sharing module 220 can allow persons to subscribe or otherwise interact with the portable device so as to view and disseminate captured loops. Examples of the available dissemination processes are described more fully below with reference to process 600. In an exemplary embodiment, sharing module 220 includes a voting module 224 that allows multiple persons interacting (or receiving the disseminated loops) to express a preference for a certain loop which may then be further disseminated based upon the number of "votes" received. Further discussion of voting is discussed below.

Figure 5:
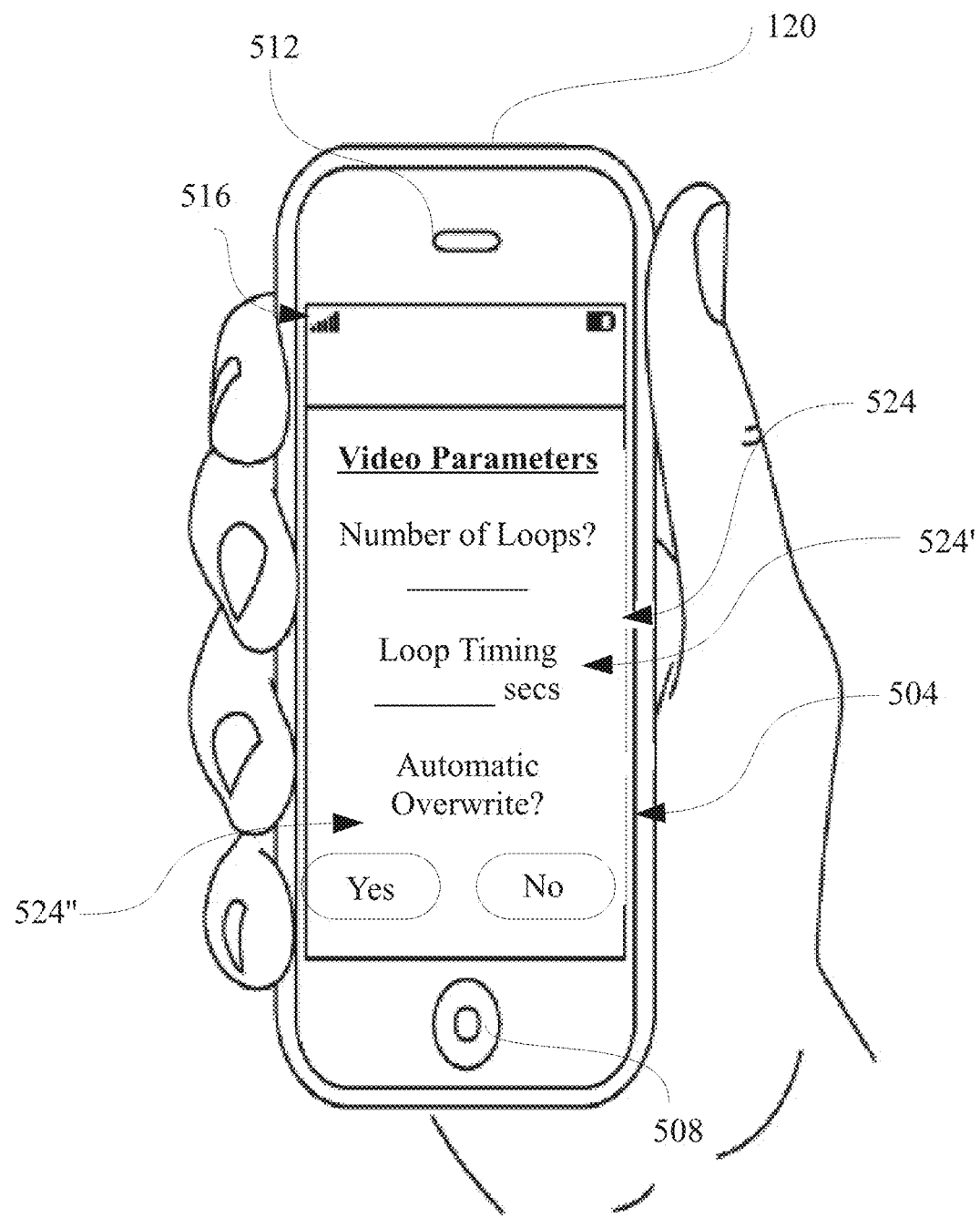
FIG. 5 is a front view schematic of a portable device for use with an LRS according to an embodiment of the present invention.
Figure 6:
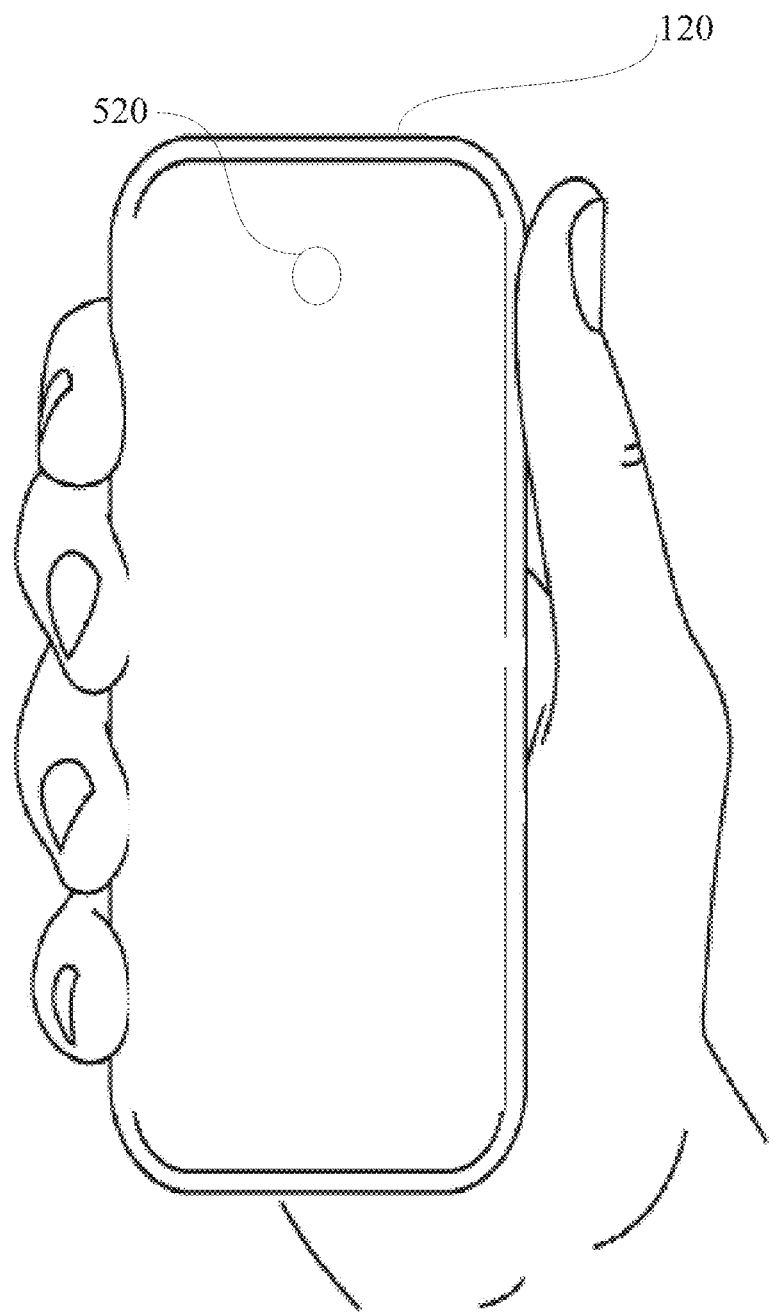
FIG. 6 is a rear view schematic of a portable device for use with an LRS according to an embodiment of the present invention.

Turning now to FIGS. 5 and 6, there is shown an implementation of a portable device 120 (FIG. 1) suitable for use with LRS 200. Portable device 120 can include a touch-sensitive display 504, an input device 508, a speaker 512, a transceiver 516, and a video recorder 520 (best seen in FIG. 6). Touch-sensitive display 504 is sometimes called a "touch screen" for convenience, and may also be known as or called a touch-sensitive display system. Touch screen 504 can be used to display information or to provide user-interface objects 524 (e.g., virtual (also called "soft") control keys, such as buttons or keyboards), thereby providing an input interface and an output interface between portable device 120 and a user. Information displayed by touch screen 504 can include graphics, maps, text, icons, video, and any combination thereof (collectively termed "graphics"). In an embodiment, and in use with LRS 200, a user can input into portable device 120 using one or more user-interface objects 524, e.g., objects 524' and 524", using touch screen 504 to designate the parameters of loop recording for LRS 200.

Touch screen 504 has a touch-sensitive surface, which uses a sensor or set of sensors to accept input from the user based on haptic and/or tactile contact. Touch screen 504 may use LCD (liquid crystal display) technology, or LPD (light emitting polymer display) technology, although other display technologies may be used in other embodiments. Touch screen 504 can detect contact (and any movement or breaking of the contact) on the touch screen and converts the detected contact into interaction with user-interface objects (e.g., one or more soft keys, icons, web pages or images) that are displayed on the touch screen. Touch screen 504 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 504. In an exemplary embodiment of the use of portable device 120, a user presses a finger to touch screen 504 so as to initiate contact. In alternative embodiments, a user may make contact with touch screen 504 using any suitable object, such as, but not limited to, a stylus.

Input device 508 facilitates navigation among and interacts with one or more user-interface objects 520 displayed in the touch screen 504. In an embodiment, input device 508 is a click wheel that can be rotated or moved such that it can be used to select one or more user-interface objects 524 displayed on touch screen 504. In an alternative embodiment, input device 508 can be a virtual click wheel, which may be either an opaque or semitransparent object that appears and disappears on the touch screen display in response to user interaction with portable device 120. In another embodiment, input device 508 is a microphone that allows portable device 120 to be responsive to user voice commands and to receive/record audio/sounds. Although not shown in FIGS. 5-6, more than one input device 508 may be included with portable device 120 so that more than one type of interaction with the portable device is available.

Transceiver 516 receives and sends signals from portable device 120. In an embodiment of portable device 120, transceiver 516 sends and receives radio frequency signals through one or more communications networks, such as network 108 (FIG. 1), and/or other computing devices, such as computing device 104. Transceiver 516 may be combined with well-known circuitry for performing these functions, including, but not limited to, an antenna system, one or more amplifiers, a tuner, one or more oscillators, a digital signal processor, a CODEC chipset, a subscriber identity module (SIM) card, and a memory. As mentioned above, transceiver 516 may communicate with one or more networks, such as the Internet, also referred to as the World Wide Web (WWW), an intranet and/or a wireless network, such as a cellular telephone network, a wireless local area network (LAN), and/or a metropolitan area network (MAN), and other devices. Portable device 120 may use any of a plurality of communications standards to communicate to networks or other devices with transceiver 516. Communications standards, protocols and technologies for communicating include, but are not limited to, Global System for Portable Communications (GSM), Enhanced Data GSM Environment (EDGE), high-speed downlink packet access (HSDPA), wideband code division multiple access (W-CDMA), code division multiple access (CDMA), time division multiple access (TDMA), Bluetooth, Wireless Fidelity (Wi-Fi) (e.g., IEEE 802.11a, IEEE 802.11b, IEEE 802.11g and/or IEEE 802.11n), voice over Internet Protocol (VoIP), Wi-MAX, a protocol for email (e.g., Internet message access protocol (IMAP) and/or post office protocol (POP)), instant messaging, e.g., extensible messaging and presence protocol (XMPP), Session Initiation Protocol for Instant Messaging and Presence Leveraging Extensions (SIMPLE), and/or Instant Messaging and Presence Service (IMPS), and/or Short Message Service (SMS), or any other suitable communication protocol.

Transceiver 516 may also be configured to assist portable device 120 in determining its current location and other information. For example, a timestamp module 216 (FIG. 2) can direct transceiver 516 to provide signals that are suitable for determining the current local time for portable device 120, as discussed in detail above. Portable device can also request input from the user as to whether or not it has identified the correct time. The user can indicate, using touch-screen 504 or other means, such as voice activation, that the timestamp module 216 has identified the appropriate time.

Portable device 120 may also include other applications or programs such as, but not limited to, word processing applications, JAVA-enabled applications, encryption, digital rights management, voice recognition, voice replication, and a browser module. The browser module may be used to browse the Internet, including searching, linking to, receiving, and displaying web pages or portions thereof, as well as attachments and other files linked to web pages.

It should be appreciated that the portable device 120 is only one example of the portable device that may be used with the present system and method, and that the portable device may have more or fewer components than mentioned, may combine two or more components, or a may have a different configuration or arrangement of the components. In the present system and method, portable device 120 may be implemented with any computing device that includes timestamp functionality and is not so large that it is very inconvenient to move it from one location to another. Thus, portable device 120 is not restricted to a smartphone or other hand-held device, and may include pad or tablet computing devices, smart books, net books, laptops, and even larger computing devices with geolocation functionality that may be moved from one location to another without significant inconvenience.

FIG. 6 shows a rear illustration of a portable device 120 displaying video recorder 520. At a high level, video recorder 520 is configured to allow for capturing images. In an exemplary embodiment, video recorder 520 is suitable for capturing high resolution images at various frame (update) rates.

Figure 7:
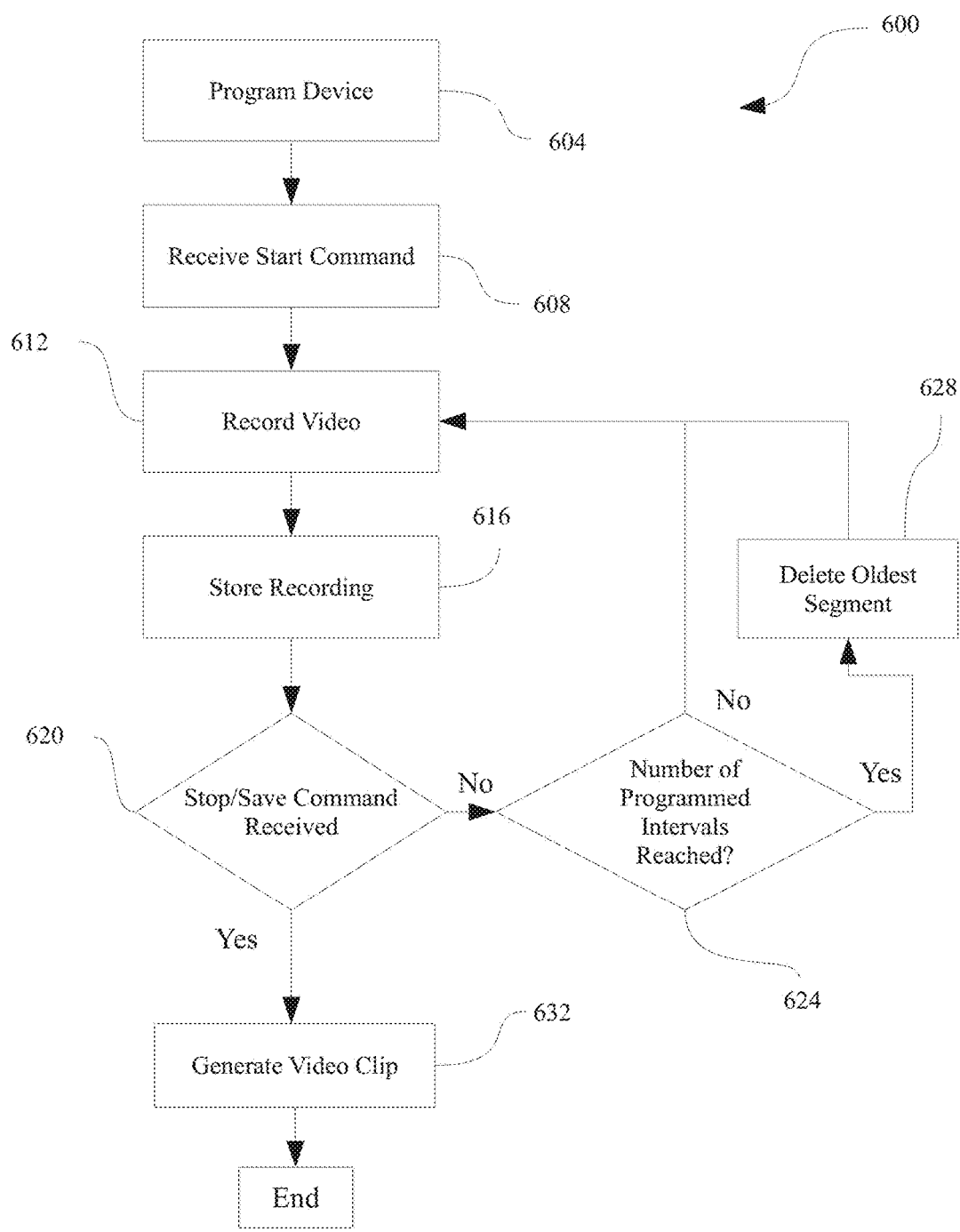
FIG. 7 is a flow diagram of a method of recording an event using an LRS according to embodiment of the present invention.

FIG. 7 shows a process of recording loops, process 600, according to an embodiment of the present invention.

At step 604, a user programs a portable device, such as portable device 120 (FIG. 1), to loop record for a specified interval of time and for a particular number of intervals. For example, a user could set the portable device to record for a 10 second interval, a 60 second interval, a 5 minute interval, a 10 minute interval, etc. Then, the user could set the portable device to record for a desired number of intervals, e.g., 3 intervals. In another embodiment, the portable device can be preprogrammed to a recording interval that is suitable for the event to be recorded. For example, when recording a tennis match, the recording interval may be set to about 25 seconds. As another example, when recording a golf match, the recording interval may be set to about 10 second intervals. The user may also specify other parameters that would impact the recording, such as, but not limited to, frame rate and actuating stop/save command type (e.g., voice command, sensor command, remote computing device (e.g., another portable device 120 in communication with the portable device doing the recording).

At step 608, the portable device receives a start command to begin recording for the chosen time interval. In an exemplary embodiment, the start command can be made by interacting with a portable device interface, such as the touch screen of a smartphone or tablet (as described above). In another exemplary embodiment, the start command could be issued using a wireless interface that enables one or more video recorders to be positioned remotely, such as, but not limited to, an Airturn DIGIT II, a Satechi Bluetooth Multimedia remote control, and other Bluetooth devices. In yet another embodiment, the start command could be issued using a mechanical or electrical switch closure such as those currently used on the lead wires of headphones, which connect directly to the portable device audio connector. In this embodiment, the switch closure can be a contact type or a non-contact type (e.g., capacitive, inductive, magnetic, optical). Alternatively, existing headphones could be used, with the start/stop switch used to initiate the start command. The aforementioned mechanical, electrical, or electro-mechanical switches could be connected to a multi-pin connector of the portable device, which can receive digital command signals (from, for example, a hard wired remote control) to the portable device to start loop recording.

The start command could also be initiated via a remote (wireless) command from a second device, such as a second smartphone, tablet, laptop, wrist-borne devices (smartwatches), etc. In another exemplary embodiment, the start command could be initiated by a sound (or lack thereof), such as, but not limited to, a referee's whistle, a pre-defined period of silence (such as the period that precedes a golf swing or a tennis serve), and a buzzer.

In another exemplary embodiment, the start command is initiated using a voice command, such as, but not limited to, "start looping" or "loop now". In this embodiment, the portable device would wait for the user to issue the appropriate voice command before commencing loop recording. In certain embodiments, the portable devices could also acknowledge receipt of the command by, for example, responding audibly with "looping now" and/or providing a blinking light on the device's display.

At step 612, portable device begins recording for the duration of time programmed by the user. The recording may be audio, video, or both, depending on the user's desires. The user (or another user with access to the portable device) may stop the recording by using, for example, a stop command. In alternative embodiments, step 612 may be interrupted by a noise (e.g. goal horn) or other activity indicating a desired stopping point.

At step 616, the recording made at step 612 is stored in a memory (such as a non-transitory storage medium) associated with the portable device. The recording can be saved, for example, to on-board memory or to a remote server. In another embodiment, steps 612 and step 616 are essentially combined, such that upon recording the data recorded is written to the memory.

At step 620, it is determined whether a stop or save command has been received. If no stop or save command has been received, the process continues to step 624, otherwise it continues to step 632.

At step 624 it is determined whether another interval should be recorded, which, in certain embodiments involves a number of considerations (discussed further below). In an exemplary embodiment, step 624 evaluates whether the number of intervals recorded since the portable device received the start command (step 608) is equal to the number of intervals that comprise a loop according to the user's preferences. If the number of intervals has been reached, the process continues to step 628; otherwise, the process returns to step 612 where another interval is recorded. For example, a user might choose to record 3 intervals each having a duration of 60 seconds. Once initiated at step 608, the portable device begins recording (step 612) to its memory in 60 second intervals and writes each of the 3 intervals to local memory (i.e., 3 files of 60 seconds each). If no request to stop or save request is received by the portable device, the portable device can overwrite the first file (i.e., from 0-60 seconds) with data recorded from minutes 3 to 4 (seconds 181 to 240). In another exemplary embodiment, a recording that has been saved to on-board memory would not be overwritten without the express consent from the portable device user. Alternatively, where saved recordings are remotely stored (such as in the cloud), the portable device could be instructed to overwrite locally saved intervals recordings upon the receipt of an acknowledgement from the remote server that the interval had been remotely saved in its entirety.

At step 628, if the number of intervals has been reached, the oldest recorded interval that has been recorded since the portable device received the start command is deleted. This deletion concept and process is more thoroughly discussed above with reference to FIGS. 3 and 4, and, for brevity, will not be repeated here.

As mentioned above, if a stop or save command is received, the process continues to step 632 where a video clip is generated from the intervals recorded by the process. This may be accomplished, for example, by using a merge module, such as merge module 218, discussed above with reference to FIG. 2. In any event, two or more intervals (or partial segments as discussed above) are typically combined, in a time sequential manner so as to create a continuous video clip of the event.

In certain embodiments, process 600 can include a determination whether a request to save any of the previously recorded intervals has been received (not shown). In an exemplary embodiment, one or more devices can command the portable device to save the recorded interval. In this embodiment, process 600 can mark the synchronous time at which the command from a device, such as a remote device, was received and associate it with the recorded interval. In certain embodiments, a text message, email, or wireless signal can be sent from a remote device over the local or wide area network to indicate that a particular person in the network would like to receive a copy of the recorded interval that was previously recorded or the presently recorded loop. Where the "save loop" command may have been entered at a time when the loop was being recorded, the loop would be saved at the end of its programmed time interval and shared with those devices/users that sent a save loop command on their remote devices. In an exemplary process 600, multiple persons can send a command to save a particular loop recording. Furthermore, a recorded loop that has been saved can be shared according to pre-programmed choices and/or by the other users with access to recordings on the portable device. Notably, receiving a save command, may or may not (depending on the privileges given the user issuing the command) operate as a stop command for the purposes of step 620.

In another embodiment, a request to save may be prompted by the occurrence of one or more external events. For example, an audio event could be used, such as a series of sounds made by a coach's or referee's whistle, the sound of the ice hockey goal scored horn, or a specially designed whistle operating at a specific frequency. As another example, a series of sounds combined with video action could also be used to automatically save one or more intervals. For example, when recording a tennis match, a series of struck balls with simultaneous motion captured by the portable device's microphone and camera could be determined to be representative of an interesting played point and thus worthy of being automatically saved. In an exemplary embodiment, automatic identification of specific sounds and/or motions can be accomplished by training the software using neural networks—mathematical training techniques that learn from a user's inputs of what constitutes an interval worth saving and could then automatically save intervals without a direct command from a user. In yet another exemplary embodiment, the portable device may be programmed to also save intervals proximate the interval designated to be saved. The number of additional intervals may be specified by the user or may be preprogrammed based on the number of segments designated by the user upon programming the device (e.g., step 604).

The portable device could also be programmed to save a recorded interval upon the receipt of a signal from a sensor. For example, a magnetically activated switch could detect a door or window opening and send a hard-wired or wireless signal to the portable device to save the loop currently being recorded. In another example, the portable device could save an interval under recording (or a subsequent series of intervals) upon the occurrence of a sound, such as, but not limited to, a window breaking on a valuable asset, e.g., car, a smoke alarm or theft alarm. In exemplary embodiments, the magnetic switch, microphone enabled switch, or other sensor in communication with the portable device, could send a hard-wired or wireless signal to the portable device to save the current interval or a series of intervals, thus providing the owners or operators of the valuable asset with important insight into which operator, trespasser, process, or activity may have contributed to the potentially damaging event while minimizing their investments in video surveillance and storage. In medical applications, portable devices could be placed in homes, assisted care, and hospital facilities, and body worn or implanted sensors could be used to detect a person falling down, a drop in blood pressure, or a cardiac arrhythmia, thereby prompting portable devices in the vicinity of the sensor wearer/user to save the loop(s). Alternatively, microphones could detect a person crying for help and send a signal to the portable device to save one or more loop(s), thereby enabling care providers to more fully understand what happened to the person and to improve the quality of care that they provide to all the persons in the facility.

In the event that the portable device does not have enough memory to record any further intervals (the implication being that all previous recordings have been designated as "saved" recordings), the process can inform the user of how much memory a new recording requires and how much memory is available. In certain embodiments, process 600 may suggest modifying the selections in order to enable the portable device to record, such as, but not limited to, reducing the duration of future recordings, the number of intervals, removing certain recordings from the portable device (e.g., large or old recordings), or reducing the frame rate.

Facilitating the saving and sharing of loop recordings recorded by portable device requires accurate timestamping. In an exemplary embodiment, the local time (of the portable device) can be accurately and automatically obtained by the portable device using either global positioning system (GPS) or cellular phone networks. The local time can be used to mark the start and stop times of every recorded interval. Moreover, each frame of the interval may also be time-stamped.

Once saved, recorded loops may be placed in remote or cloud data storage, such as but not limited to, Dropbox, Google Drive, Apple iCloud, etc. Furthermore, recorded loops may be distributed through social networking providers, including but not limited to, YouTube, Vine, Google+, Facebook, etc.

Saved loops may also be linked to by sending notices out through social networking providers, including but not limited to, Twitter, Google+, Facebook, etc. In an exemplary embodiment, the portable device is announced as "available to be accessed by others" through these social networks. These announcements would enable other persons that may be attending the event to utilize the portable device so that they could receive important saved loops or so that they could request a specific loop or series of loops be saved for them (video or link to the video subsequently sent to them via text or email; or made available to them via a shared folder on the looping device or stored within a folder on a remote server). Alternatively, or in conjunction with the aforementioned broadcast over social media networks, the saved loop could be re-broadcast to a local viewing screen equipped with an appropriate interface (Wi-Fi, Bluetooth) such as may be built in to the viewer or provided by an external box such as Apple TV.

In an exemplary embodiment, notices (e.g., email, text, Twitter feed) can provide a hyperlink to a specific location of the saved loop or loops (e.g., URL) and may include a "tag" with key information about the recorded loop(s) such as the geolocation of the portable device, description of the recorded event, notes, etc. An example of this tag (which would be pre-programmed by the portable device user or by a remote user) could read as follows: #CVU VFH coach_ CVU scores first leads SBHS 1-0. In this example, the portable device user is identified (Champlain Valley Union varsity field hockey coach), and the important info (CVU scored first) and the resulting score against their rival team, South Burlington High School (SBHS). Linking to this video would allow a person interested in this field hockey game to view a recording of the goal that CVU scored.

The portable device may be accessible via local Bluetooth, Wi-Fi, or through a remote server using suitable software. Access to video and/or audio recordings on the portable device may be restricted to authorized persons or access may be unrestricted. These programmable selections are made by the portable device user and would be used to limit control of saving and distribution of recorded loops. For example, the portable device user may choose to make the portable device visible to all other devices in the local area network (LAN), the user may choose to make the portable device visible to only a select group of other devices (such as a "buddy list"), or the user may choose to make the portable device invisible and inaccessible to others.

In certain instances, a number of persons that are viewing a live event being recorded by a portable devices as described herein can "vote", using voting module 224, to save one or more recorded loops, with the number of "votes" determining whether a loop is saved or with the number of votes being transmitted along with the loop (as discussed just above) so that those people interested in the event can ascertain the relative importance of the loop.

A portable device according to the present disclosure overcomes many of the limitations of other recording devices and methods. For example, the portable device can include a programmable user interface so as to set the loop duration, can allow for the remote sending of commands such "start looping" or "save loop" or "vote for loop", and can allow for multiple persons to access and control certain features of the portable device. These features make the portable device uniquely applicable for sporting applications where the users may not be able to readily access an appropriate placement (positioned so as to record items of interest, e.g., goals).

A portable device according to the present disclosure allows for viewers to fully experience the event they are watching or actively participating in, without being burdened by holding and monitoring the device while making a recording. The portable device also requires no external systems for video capture, recording, and remote sharing, e.g., no suite of remote cameras, cables, data storage devices, display monitors, etc. Therefore, the burden of cost and complexity of the recording system decreases, while the number of applications that can be served increases.

Additionally, the portable device does not require a significant amount of on-board memory to record the significant and/or most interesting parts of an event. For example, one hour of video recording may use as much as 5 GB of memory. However, many users cannot store files of that size because their handheld devices (e.g., smartphone) are storing other data, including applications, music libraries, contact information, etc. Therefore, recordings of duration of one or more hours typically need to be edited or "clipped" in order that only the portion of the video that is of interest to the end user is actually saved. For example, a typical tennis match may last for several hours, yet the best points played may last for only 30 seconds. A portable device and process as disclosed herein allows the recording of only the best points played. Therefore the amount of memory required is greatly reduced and users are not burdened reviewing a long video recording, editing the recording, and then sending the edited clip to others that may have been participating in the match, watching it from the stands, or coaching the players.

A system as disclosed herein also facilitates rapid dissemination of that portion of an event that would be of interest in order to enable an immediate review of what has just happened, i.e., to provide an "instant replay" to others watching the event or those not able to attend the live performance. By recording only the relatively short portion of interest, and by eliminating the need to edit the video, the portion of interest can be rapidly communicated to those persons that want to review it and/or share it with others. Moreover, these short video/audio clips can be used for training, teaching, learning, or just for enjoyment.

Figure 8:
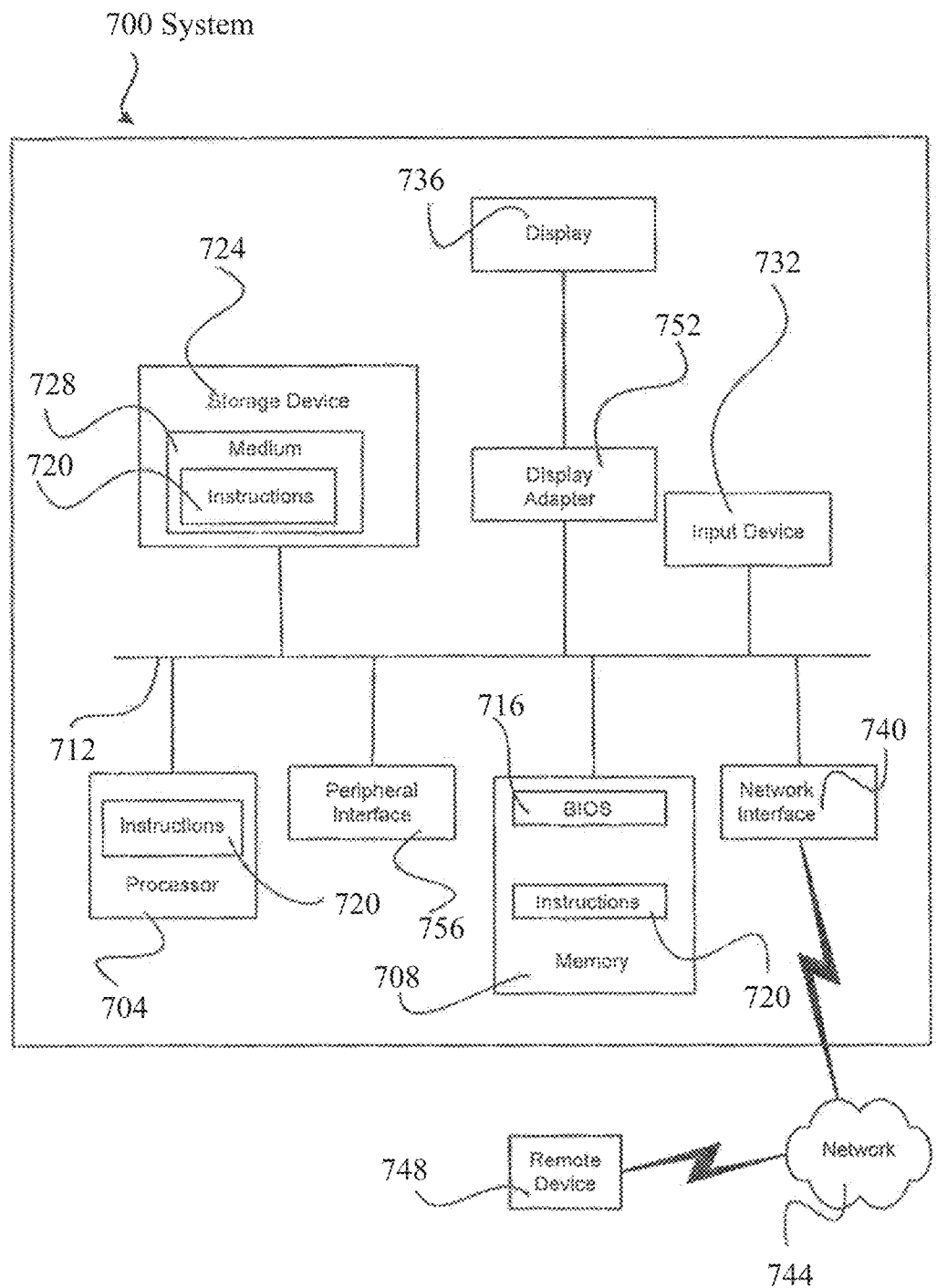
FIG. 8 is a schematic representation of a computer system suitable for use with the LRS according to an embodiment of the present invention.

FIG. 8 shows a diagrammatic representation of one embodiment of a computing device in the exemplary form of a computer system 700 within which a set of instructions for causing a portable device, such as portable device 120 or computing device 104, to perform any one or more of the aspects and/or methodologies of the present disclosure may be executed. It is also contemplated that multiple computing devices may be utilized to implement a specially configured set of instructions for causing the device to perform any one or more of the aspects and/or methodologies of the present disclosure. Computer system 700 includes a processor 704 and a memory 708 that communicate with each other, and with other components, via a bus 712. Bus 712 may include any of several types of bus structures including, but not limited to, a memory bus, a memory controller, a peripheral bus, a local bus, and any combinations thereof, using any of a variety of bus architectures.

Memory 708 may include various components (e.g., machine readable media) including, but not limited to, a random access memory component (e.g., a static RAM "SRAM", a dynamic RAM "DRAM", etc.), a read only component, and any combinations thereof. In one example, a basic input/output system 716 (BIOS), including basic routines that help to transfer information between elements within computer system 700, such as during start-up, may be stored in memory 708.

Memory 708 may also include (e.g., stored on one or more machine-readable media) instructions (e.g., software) 720 embodying any one or more of the aspects and/or methodologies of the present disclosure. In another example, memory 708 may further include any number of program modules including, but not limited to, an operating system, one or more application programs, other program modules, program data, and any combinations thereof.

Computer system 700 may also include a storage device 724. Examples of a storage device (e.g., storage device 724) include, but are not limited to, a hard disk drive for reading from and/or writing to a hard disk, a magnetic disk drive for reading from and/or writing to a removable magnetic disk, an optical disk drive for reading from and/or writing to an optical medium (e.g., a CD, a DVD, etc.), a solid-state memory device, and any combinations thereof. Storage device 724 may be connected to bus 712 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 724 (or one or more components thereof) may be removably interfaced with computer system 700 (e.g., via an external port connector (not shown)). Particularly, storage device 724 and an associated machine-readable medium 728 may provide nonvolatile and/or volatile storage of machine-readable instructions, data structures, program modules, and/or other data for computer system 700. In one example, software 720 may reside, completely or partially, within machine-readable medium 728. In another example, software 720 may reside, completely or partially, within processor 704.

Computer system 700 may also include an input device 732. In one example, a user of computer system 700 may enter commands and/or other information into computer system 700 via input device 732. Examples of an input device 732 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), touch screen, and any combinations thereof. Input device 732 may be interfaced to bus 712 via any of a variety of interfaces (not shown) including, but not limited to, a serial interface, a parallel interface, a game port, a USB interface, a FIREWIRE interface, a direct interface to bus 712, and any combinations thereof. Input device 732 may include a touch screen interface that may be a part of or separate from display 736, discussed further below. Input device 732 may be utilized as a user selection device for selecting one or more graphical representations in a graphical interface as described above. Input device 732 may also include sensors, such as a tachometer sensor as discussed above. The output of the sensors can be stored, for example, in storage device 724 and can be further processed to provide, for example, analysis of the clamp force value over time, by processor 704.

A user may also input commands and/or other information to computer system 700 via storage device 724 (e.g., a removable disk drive, a flash drive, etc.) and/or network interface device 740. A network interface device, such as network interface device 740 may be utilized for connecting computer system 700 to one or more of a variety of networks, such as network 744, and one or more remote devices 748 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 744, may employ a wired and/or a wireless mode of communication. In general, any network topology may be used. Information (e.g., data, software 720, etc.) may be communicated to and/or from computer system 700 via network interface device 740.

Computer system 700 may further include a video display adapter 752 for communicating a displayable image to a display device, such as display device 736. Examples of a display device include, but are not limited to, a liquid crystal display (LCD), a cathode ray tube (CRT), a plasma display, a light emitting diode (LED) display, and any combinations thereof. Display adapter 752 and display device 736 may be utilized in combination with processor 704 to provide a graphical representation of a utility resource, a location of a land parcel, and/or a location of an easement to a user. In addition to a display device, a computer system 700 may include one or more other peripheral output devices including, but not limited to, an audio speaker, a printer, and any combinations thereof. Such peripheral output devices may be connected to bus 712 via a peripheral interface 756. Examples of a peripheral interface include, but are not limited to, a serial port, a USB connection, a FIREWIRE connection, a parallel connection, and any combinations thereof.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A loop recording system for recording a live event comprising:
   a portable video recording device including a non-transitory storage medium and a processor, the processor executing a set of instructions for:
      receiving, at the portable video recording device, an interval length and an interval number, wherein the interval length is greater than 4 seconds and less than 30 seconds, and wherein the interval number is greater than or equal to 3;
      receiving, at the portable video recording device, a command from a user;
      recording a video segment as a result of the command, the video segment having a duration equal to the interval length, the video segment including a video data stream, an audio data stream, or both;
      saving the video segment to the non-transitory storage medium; and
      repeating the recording a video segment and the saving the video segment until the number of video segments recorded is equal to the interval number,
         wherein, when the number of video segments recorded is equal to the interval number and the portable video recording device has not received a command to stop recording, the processor executes a set of instructions to:
            delete a then oldest video segment from the non-transitory storage medium; and
            record another video segment, the another video segment having the duration, the video segment including a video data stream, an audio data stream, or both; and
            save the another video segment to the non-transitory storage medium.

2. A loop recording system according to claim 1, wherein, when the user transmits a signal, representative of an instruction to stop or save a recording, to the portable video recording device, the processor executes a set of instructions to:

stop or save the recording of a then current video segment; and merge each video segment that has been recorded but not deleted so as to create a video clip that has a maximum length equal to the interval number times the interval length.

3. A loop recording system according to claim 2, wherein the instruction to stop or save a recording is provided by a sensor.

4. A loop recording system according to claim 3, wherein the sensor is configured to send a signal, representative of an instruction to stop recording, upon the occurrence of a predetermined event or series of events.

5. A loop recording system according to claim 3, wherein the sensor is coupled to a grip of a racket.

6. A loop recording system according to claim 3, wherein the sensor is coupled to a goal.

7. A loop recording system according to claim 3, wherein the sensor is an audio sensor that sends a signal, representative of an instruction to stop recording, upon the occurrence of a predetermined sound.

8. A loop recording system according to claim 7, wherein the predetermined sound is a horn.

9. A loop recording system according to claim 1, wherein the duration is a function of a recording space available on the non-transitory storage medium.

10. A loop recording system according to claim 1, wherein the video clip has a length of less than 2 minutes.

11. A loop recording system according to claim 1, wherein the length of the video clip is greater than the interval length.

12. A loop recording system according to claim 1, wherein the command is provided by the user from a remote device.

13. A loop recording system according to claim 1, further including a second portable video recording device, wherein the portable video recording device and the second portable video recording device are time synchronized so as to record the live event simultaneously from different viewpoints.

14. An event recording system comprising:
a remote recording device including a video recorder having a non-transitory storage medium divided, at least in part, into a predetermined number of partitions, the remote recording device configured to:
record a plurality of video segments, wherein each of the plurality of video segments has a duration and is saved into a corresponding respective one of the predetermined number of partitions;
delete a then oldest video segment when the plurality of recorded video segments equals the predetermined number of partitions;
record a new video segment in the partition occupied by the then oldest video segment;
stop the recording of a then current video segment when instructed by a user; and
sequentially merge the then current video segment with the plurality of video segments after the stopping of the recording to generate a video clip, wherein the video clip is saved to a non-transitory storage medium in a location that does not include the predetermined number of partitions.

15. An event recording system according to claim 14, wherein the number of the plurality of video segments is at least 3.

16. An event recording system according to claim 15, wherein the number of the plurality of video segments is less than 7.

17. An event recording system according to claim 14, wherein a size of each of the predetermined number of partitions is a function of a recording space available on the non-transitory storage medium.

18. An event recording system according to claim 14, wherein a size of each of the predetermined number of partitions is 2 minutes.

19. An event recording system according to claim 14, wherein a size of each of the predetermined number of partitions is equal to a record length input by a user.

20. An event recording system according to claim 14, wherein an input is provided by a user from a remote device, the input setting the predetermined number of partitions.

21. An event recording system according to claim 14, further including a sensor in electronic communication with the remote recording device.

22. An event recording system according to claim 21, wherein the sensor is coupled to a grip of a racket.

23. An event recording system according to claim 21, wherein the sensor is coupled to a goal.

24. An event recording system according to claim 21, wherein information recorded by the sensor is combined with the video clip.

25. An event recording system according to claim 21, wherein the sensor is configured to send a signal, representative of a command to stop, upon the occurrence of a predetermined noise.

26. An event recording system according to claim 25, wherein the predetermined noise is a horn.

* * * * *